(12) United States Patent
Tu et al.

(10) Patent No.: US 7,323,843 B2
(45) Date of Patent: Jan. 29, 2008

(54) METHOD AND DEVICE FOR TREATING SIGNALS FOR DETECTION OF STATOR AND ROTOR ERRORS IN MAGNETIC CIRCUITS IN A SYNCHRONOUS MACHINE

(75) Inventors: Xuan Main Tu, Ecublens (CH); Jean-Jacques Simond, Morges (CH)

(73) Assignee: Ecole Polytechnique Federale De Lausanne (EPFL), Luasanne (CH)

( * ) Notice: Subject to any disclaimer, the term of this patent is extended or adjusted under 35 U.S.C. 154(b) by 0 days.

(21) Appl. No.: 10/545,769

(22) PCT Filed: Feb. 25, 2004

(86) PCT No.: PCT/CH2004/000101

§ 371 (c)(1),
(2), (4) Date: Jul. 26, 2006

(87) PCT Pub. No.: WO2004/079888

PCT Pub. Date: Sep. 16, 2004

(65) Prior Publication Data

US 2006/0261774 A1    Nov. 23, 2006

(30) Foreign Application Priority Data

Mar. 5, 2003    (EP) .................................. 03004796

(51) Int. Cl.
*G01R 33/02* (2006.01)
*H02H 7/08* (2006.01)
*G01M 1/38* (2006.01)

(52) U.S. Cl. ...................... 318/652; 318/638; 318/490; 324/207.11; 324/207.13; 324/207.25; 73/865.9; 73/462

(58) Field of Classification Search ..................... None
See application file for complete search history.

(56) References Cited

U.S. PATENT DOCUMENTS

| 3,743,934 | A | * | 7/1973 | Risch .......................... 324/224 |
| 4,199,718 | A | | 4/1980 | Hiroshi et al. |
| 4,491,019 | A | * | 1/1985 | Wicki et al. ................... 73/457 |
| 4,924,180 | A | * | 5/1990 | Nasr et al. .............. 324/207.15 |

(Continued)

FOREIGN PATENT DOCUMENTS

DE    12 26 200 B    10/1966

(Continued)

OTHER PUBLICATIONS

S. Nandi et al., "Condition Monitoring and Fault Diagnosis of electrical Machines—A Review"; 1999, Industry Applications Conference, 1999, 34th IAS Annual Mtg., XP01035517.

(Continued)

*Primary Examiner*—Lincoln Donovan
*Assistant Examiner*—Eduardo Colon Santana
(74) *Attorney, Agent, or Firm*—Pearne & Gordon LLP

(57) ABSTRACT

It is possible to determine the types and values of stator and rotor errors in magnetic circuits in a synchronous machine by measuring the induced voltage ($u_i$) for the terminals of measurement loops which can capture an image of the induction in the measurement gap, then by treating said signals.

20 Claims, 6 Drawing Sheets

U.S. PATENT DOCUMENTS 5,336,996 A * 8/1994 Rusnak .................... 324/207.2
5,513,539 A * 5/1996 McLaughlin et al. ...... 73/865.9
5,936,370 A * 8/1999 Fukao et al. ................ 318/652
6,062,078 A * 5/2000 Meisberger .................. 73/462
6,350,224 B1 * 2/2002 Cordaro et al. ................ 494/7
6,635,007 B2 * 10/2003 Evans et al. ................... 494/7

FOREIGN PATENT DOCUMENTS

FR    2 824 914 A    11/2002
GB    1 462 760 A    1/1977

OTHER PUBLICATIONS

W. JanBen, "Luftspaltuberwachung von Vollpol-Synchrongeneratoren unter Berucksichtigung paralleler Wicklungszweige", Electrical Eng. 78 (1994) (3 pgs.).

* cited by examiner

METHOD AND DEVICE FOR TREATING SIGNALS FOR DETECTION OF STATOR AND ROTOR ERRORS IN MAGNETIC CIRCUITS IN A SYNCHRONOUS MACHINE

The content of Application No PCT/CH2004/000101, filed Feb. 25, 2004 in Switzerland is incorporated here by reference.

BACKGROUND OF THE INVENTION

The present invention relates to a method for processing induced voltage signals supplied by measurement turns arranged on a synchronous machine, and also to the associated device, which make it possible to detect and measure the stator and rotor errors in the magnetic circuits of said synchronous machine.

PRIOR ART

In a synchronous machine with salient poles which has a large number of poles, the air gap, that is to say the space between the rotor and the stator, is extremely small with respect to the outer diameter of the rotor of the machine. For this reason, it is virtually impossible to ensure perfect centering of the rotor in the stator.

Moreover, the stator has the overall shape of a hollow cylinder with a wall of very small thickness compared to the diameter of the rotor, and is fixed to the carcass of the machine at a number of anchoring points. Consequently, the stator represents the smallest mechanical structure of the machine; it is therefore susceptible to deformation.

A rotor of very large diameter, despite dynamic balancing, may have a residual unbalance. Moreover, this rotor consists of a large number of poles which each have a field coil. After a certain period of use of the machine, there is a risk of a partial short-circuit of one or more of these field coils.

The aforementioned stator and rotor errors in the magnetic circuits give rise to a non-uniform distribution of the induction below each pole, thus creating considerable magnetic forces which may be up to several hundred tons and can cause in some cases sticking of the rotor in the stator, leading to considerable damage to the machine.

In order to control these errors, most existing monitoring devices use capacitive sensors to measure the air gap of the machine at several locations on the inner periphery of the stator. These devices have two major drawbacks:

- the capacitive sensors are relatively complex and expensive in order to ensure good reliability of the measurement of the air gap,
- just measuring the mechanical air gap does not provide any indication with regard to the actual unilateral attraction force, given that the latter also depends on the currents induced in the various windings of the machine.

In the publication "Luftspaltüberwachung von Vollpolsynchrongeneratoren unter Berücksichtigung paralleler Wicklungszweige", published in "Electrical Engineering Vol. 78; No. 1; December 1994; pp. 29-31; by M. W. Janssen", the author proposes the use of measurement turns placed at the stator of the machine to capture the flux in the air gap so as to study the damping factor due to the damping winding and to the parallel branches of the armature winding. This study is limited to determining this damping factor and does not propose any solution for determining the actual value of the eccentricity, nor the non-compensated attraction effect which results therefrom.

SUMMARY OF THE INVENTION

A first object of the invention is therefore to propose an improved method for processing signals measured on the machine, which makes it possible to determine the type and value of the stator and rotor errors in the magnetic circuits.

Another object of the invention is to propose an improved device for continuously monitoring and processing signals measured on the machine, which makes it possible to determine the type and value of the stator and rotor errors in the magnetic circuits.

BRIEF DESCRIPTION OF THE DRAWINGS

One particular embodiment of the method according to the invention and of the associated device according to the invention are described below, this description being given with reference to the appended drawing which comprises the following figures, in which.

DESCRIPTION OF THE PREFERRED EMBODIMENT

Figure 1:
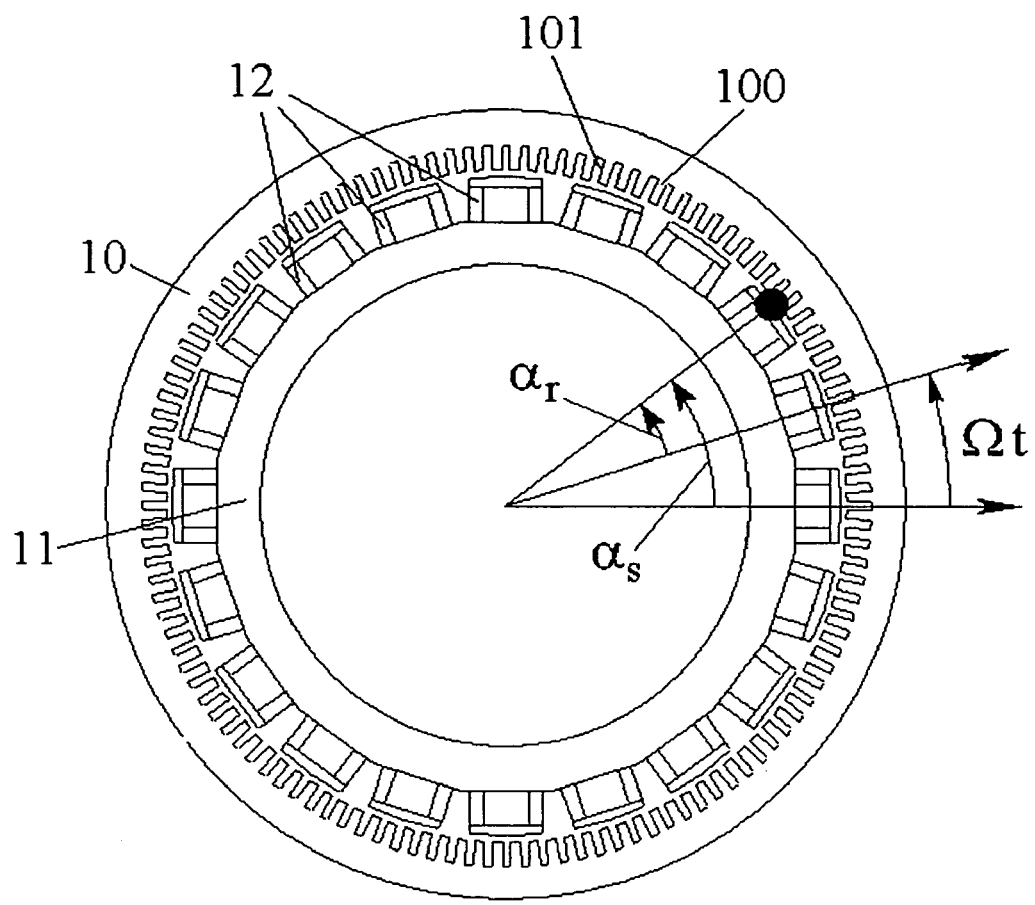
FIG. 1 is a sectional view of a conventional synchronous machine with salient poles.

FIG. 1 is a sectional view of a conventional synchronous machine with salient poles, consisting of a stator 10 comprising a plurality of teeth 100 separated by recesses 101 and a rotor 11 equipped with field windings 12. A stator winding (not shown in this figure) is housed in the recesses 101.

Figure 2:
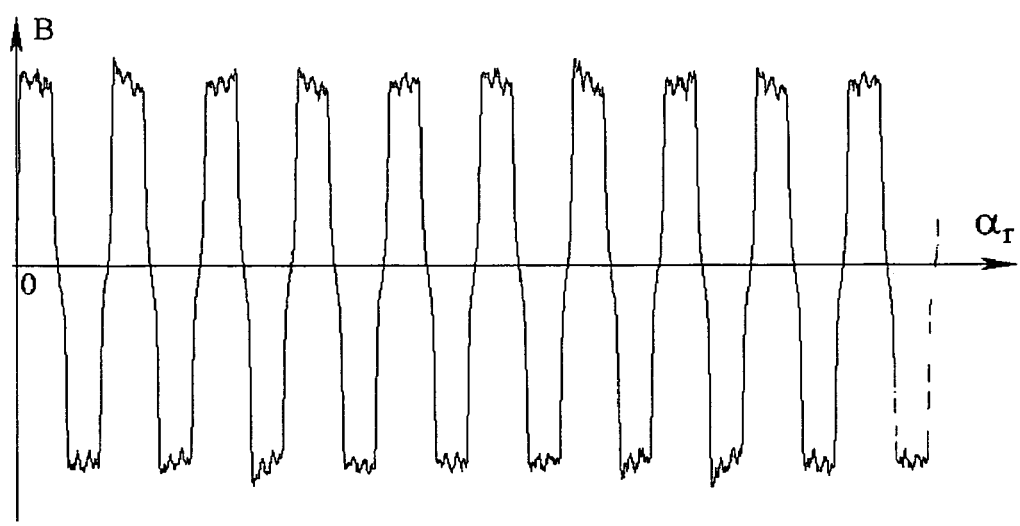
FIG. 2 shows the distribution of the induction generated by the field winding in the air gap of an ideal machine without errors.

When the machine does not have any errors and is perfectly centered, the induction in the air gap of the empty machine, as shown in FIG. 2, may be expressed by a Fourier series:

$$B_i(\alpha_r) = \sum_\nu {}^\nu B_{\max} \sin(\nu \alpha_r + {}^\nu \phi_B) \quad [1]$$

in which:
$^\nu B_{max}$ amplitude of the $\nu^{th}$-order harmonic
$^\nu \Phi_B$: phase of the $\nu^{th}$-order harmonic
$\alpha_r$: geometric angle in a universal set related to the rotor It can be seen that, in addition to the $\nu^{th}$-order fundamental=p, p being the number of pairs of poles of the machine, the induction curve has higher-order harmonics due to the recessing of the stator and to the salience of the poles of the rotor.

When the rotor rotates at a constant angular speed $\Omega$, the induction in the air gap as a function of the angle $\alpha_s$ in a universal set related to the stator can be written:

$$B_i(\alpha_s) = \sum_\nu {}^\nu B_{max} \sin(\nu(\alpha_s - \Omega t) + {}^\nu \phi_B) \quad [2]$$

The aforementioned stator and rotor errors in the magnetic circuits, regardless of whether these are mechanical such as an eccentricity or deformations or electrical such as one or more insulation errors in the field coils, give rise to a non-uniform distribution of the induction below each pole, thus creating considerable magnetic forces which may be up to several hundred tons and can cause in some cases sticking of the rotor in the stator, leading to considerable damage to the machine.

Figure 3:
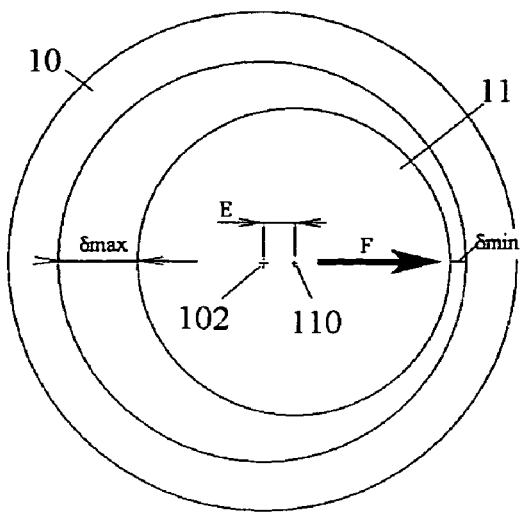
FIG. 3 shows the relative position of the rotor with respect to the stator in the case of a static eccentricity.
Figure 4:
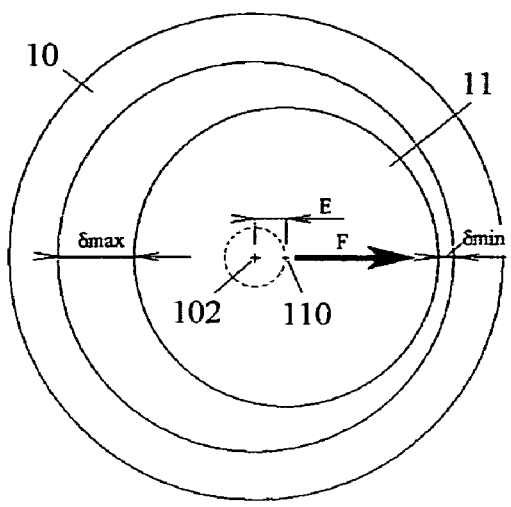
FIG. 4 shows the relative position of the rotor with respect to the stator in the case of a dynamic eccentricity.

FIGS. 3 and 4 show the effect of poor centering of the rotor with respect to the stator, the rotor and the stator being assumed not to be deformed.

FIG. 3 shows the relative position of the rotor 11 with respect to the stator 10 in the case of a static eccentricity. In this case, the center of rotation, respectively the axis of rotation 110 of the rotor, is fixed relative to the geometric center, respectively to the longitudinal axis 102 of the stator.

FIG. 4 shows the relative position of the rotor 11 with respect to the stator 10 in the case of a dynamic eccentricity. In this case, the center of rotation, respectively the axis of rotation 110 of the rotor, revolves around the geometric center, respectively around the longitudinal axis 102 of the stator.

It should be noted that there is generally a combined eccentricity resulting from the juxtaposition of a static eccentricity and a dynamic eccentricity.

Figure 5:
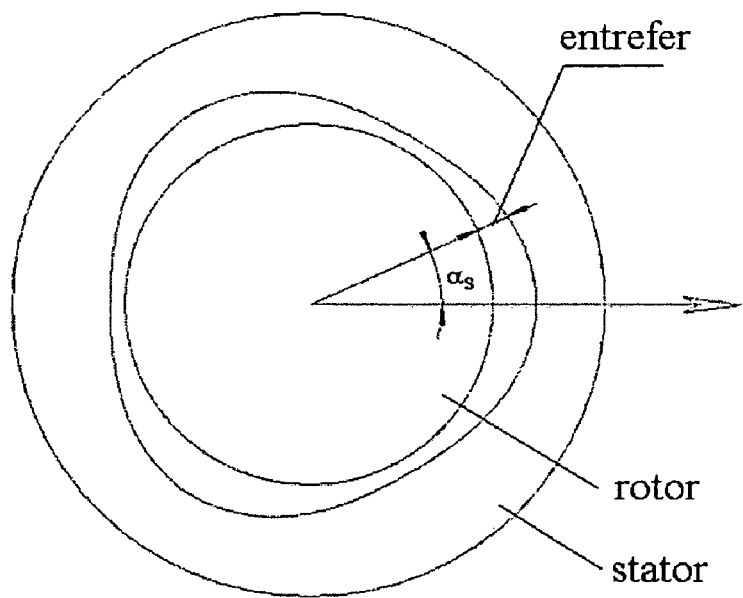
FIG. 5 shows a machine with a deformed stator.

FIG. 5 shows an example of a deformed stator. In this example, the stator has an essentially triangular shape with rounded sides and corners. In general, a deformed stator may have an oval shape or the shape of a rounded polygon with n sides.

It can be seen that, in the examples shown in FIGS. 3 to 5, the air gap of the machine is not constant but rather varies as a function of the angle $\alpha_s$ and as a function of time. This variation gives rise to a modulation of the induction in the air gap, according to the laws which will be explained below.

In the general case where the bore, respectively the stator, is deformed and where the center of rotation of the rotor can move with respect to the stator, the induction in the air gap satisfies the following equation:

$$B(\alpha_s) = B_i(\alpha_s) \cdot \Lambda_\alpha(\alpha_s) \cdot \Lambda_r(\alpha_s) \quad [3]$$

in which:

$$B_i(\alpha_s) = \sum_\nu {}^\nu B_{max} \sin(\nu(\alpha_s - \Omega t) + {}^\nu \phi_B) \quad [2]$$

induction in the air gap of an ideal machine (machine with no errors in the magnetic circuit and with a perfectly centered rotor), $$\Lambda_a(\alpha_s) = 1 + \sum_\eta {}^\eta \Lambda_{a\,max} \sin(\eta \alpha_s + {}^\eta \phi_{\Lambda a}) \quad [4]$$

function expressing a stator-related error (for example deformation of the bore, static eccentricity)
where:
$^\eta \Lambda_{a\,max}$: amplitude of the stator-related error harmonic
$^\eta \Phi_{\Lambda a}$: phase of the stator-related error harmonic
$\eta$: order of the stator-related error harmonic $$\Lambda_r(\alpha_s) = 1 + \sum_\kappa {}^\kappa \Lambda_{r\,max} \sin(\kappa(\alpha_s - \Omega t) + {}^\kappa \phi_{\Lambda r}) \quad [5]$$

function expressing a rotor-related error (for example dynamic eccentricity, partial short-circuit of the coils of the field winding)
where:
$^\kappa \Lambda_{r\,max}$: amplitude of the rotor-related error harmonic
$^\kappa \Phi_\Lambda$: phase of the rotor-related error harmonic
K: order of the rotor-related error harmonic By replacing [2], [4] and [5] in [3], the following is obtained:

$$B(\alpha_s) = \left[ \sum_\nu {}^\nu B_{max} \sin(\nu(\alpha_s - \Omega t) + {}^\nu \phi_B) \right] \quad [6]$$
$$\left[ 1 + \sum_\eta {}^\eta \Lambda_{a\,max} \sin(\eta \alpha_s + {}^\eta \phi_{\Lambda a}) \right]$$
$$\left[ 1 + \sum_\kappa {}^\kappa \Lambda_{r\,max} \sin(\kappa(\alpha_s - \Omega t) + {}^\kappa \phi_{\Lambda r}) \right]$$

Figure 6:
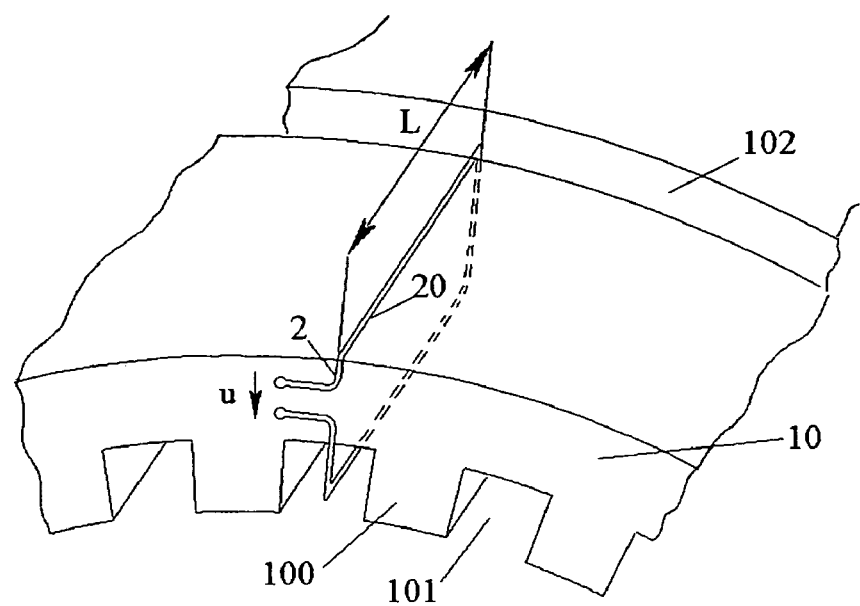
FIG. 6 shows an example of the positioning of a measurement turn.

The image of the induction in the air gap may be captured by installing a plurality of individual measurement turns or loops which are distributed along the periphery of the stator, these individual turns each surrounding a portion of the yoke of the stator by passing successively into the air gap of the machine and into the ventilation slots, as seen in FIG. 6.

Said figure shows a portion of the stator 10 comprising a number of teeth 100 separated by the recesses 101. Over the length of the stator, there are a number of ventilation slots 102 which make it possible to discharge the heat produced during operation of the machine. A measurement loop 2, in this case comprising a single turn 20, has been installed as mentioned above on this portion of the stator. A number of measurement loops 2 as above are regularly arranged around the periphery of the stator. Given that it involves measuring an induced voltage u which is said to be an image of the induction B($\alpha_s$) at the measurement location, other arrangements of the measurement loop 2 may also be envisaged, for example with said loop surrounding one or more teeth 100. In this case, the induced voltage which is measured will remain an image of the induction in the air gap at this location and will not differ from the following equations or relations other than by a constant coefficient.

If an arrangement as shown in FIG. 6 is followed, with the loop 2 comprising a single measurement turn and being arranged as shown, the induced voltage u at the terminals of the turn is:

$$u = B(\alpha_s) \cdot V \cdot L \quad [7]$$

in which $B(\alpha_s)$: induction in the air gap at the location of the turn

V: tangential speed of the rotor at the air gap; this speed is constant in a synchronous machine operating under normal conditions L: axial length of the turn Under these conditions, the induced voltage u at the terminals of the turn is directly the image of the induction in the air gap.

By replacing the expression [6] of $B(\alpha_s)$ in [7], the following is obtained:

$$u(\alpha_s) = V \cdot L \cdot \left[ \sum_\upsilon {}^\upsilon B_{\max} \sin(\upsilon(\alpha_s - \Omega t) + {}^\upsilon \phi_B) \right] \left[ 1 + \sum_\eta {}^\eta \Lambda_{a\max} \sin(\eta \alpha_s + {}^\eta \phi_{\Lambda a}) \right] \left[ 1 + \sum_\kappa {}^\kappa \Lambda_{r\max} \sin(\kappa(\alpha_s - \Omega t) + {}^\kappa \phi_{\Lambda r}) \right] \quad [8]$$

If $\alpha_{si}$ is the angular position of the turn i on the periphery of the stator, the induced voltage at the terminals of this turn i is given by:

$$u(\alpha_{si}) = V \cdot L \cdot \left[ \sum_\upsilon {}^\upsilon B_{\max} \sin(\upsilon(\alpha_{si} - \Omega t) + {}^\upsilon \phi_B) \right] \left[ 1 + \sum_\eta {}^\eta \Lambda_{a\max} \sin(\eta \alpha_{si} + {}^\eta \phi_{\Lambda a}) \right] \left[ 1 + \sum_\kappa {}^\kappa \Lambda_{r\max} \sin(\kappa(\alpha_{si} - \Omega t) + {}^\kappa \phi_{\Lambda r}) \right] \quad [9]$$

Figure 7:
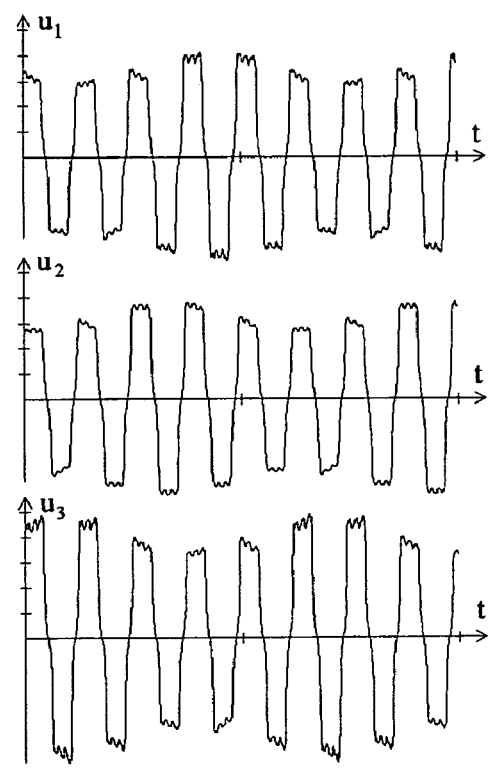
FIG. 7 shows the signals measured at the terminals of three measurement turns.

FIG. 7 shows an example of the induced voltages $u_1$, $u_2$ and $u_3$ at the terminals of three measurement turns placed at three different locations on the periphery of a stator of a machine exhibiting the particular case of a hybrid eccentricity and of a non-deformed stator.

Processing of the induced voltage signals at the terminals of the measurement turns makes it possible to deduce the variation in the air gap of the machine as a function of the angle $\alpha_s$ and as a function of time.

Figure 8:
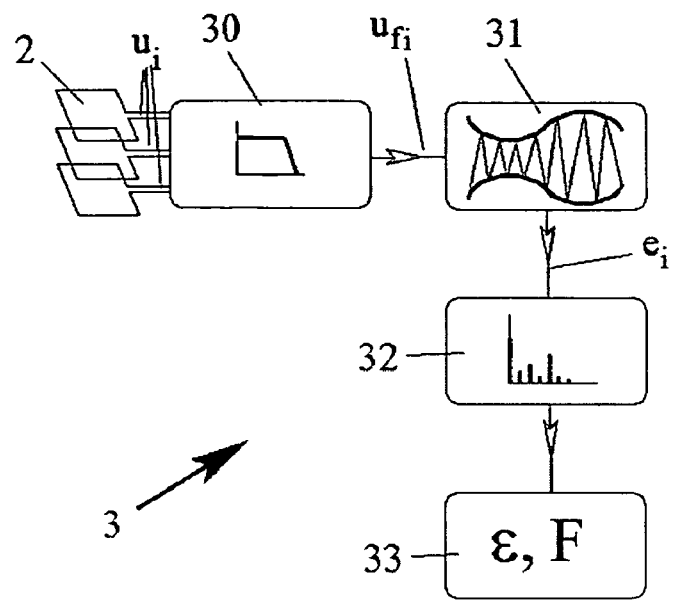
FIG. 8 shows the progress of the steps of the method according to the invention.

In order to be able to be processed, the signals $u_i$, respectively $u_1$, $u_2$ and $u_3$, are firstly sent to filtering means 30 which form part of processing means 3 shown in FIG. 8. These filtering means 30 have the function of eliminating the harmonic components whose frequencies are greater than that of the fundamental frequency $f_n$ defined by:

$$f_n = p \cdot \Omega / 2\pi \quad [10]$$

p: number of pairs of poles of the machine

Figure 9:
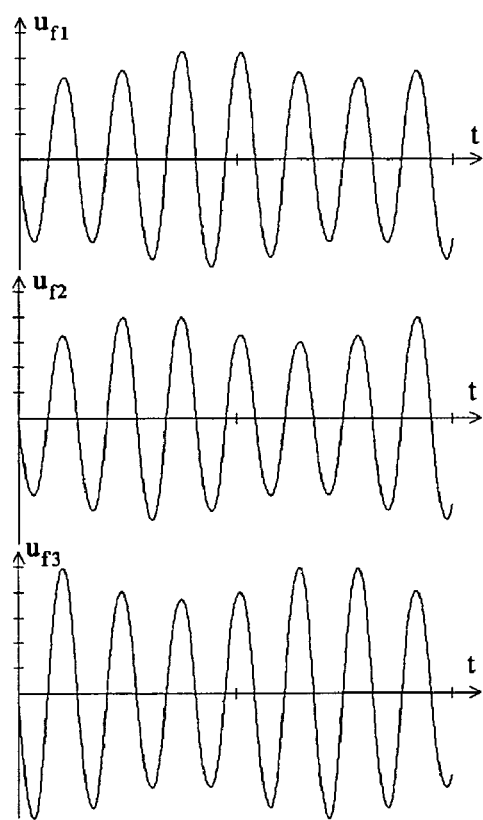
FIG. 9 shows the output signals after filtering.

FIG. 9 shows the signals $u_{f1}$, $u_{f2}$ and $u_{f3}$ at the output of the filtering means 30. Assuming perfect filtering, that is to say an elimination of the harmonic components having frequencies greater than $f_n$, the signals at the output of the filtering means are given by:

$$u_{fi} = V \cdot L \left[ 1 + \sum_\eta {}^\eta \Lambda_{a\max} \sin(\eta \alpha_{si} + {}^\eta \phi_{\Lambda a}) \right] \quad [11]$$

$$[{}^r B_{\max} \sin(p(\alpha_{si} - \Omega t) + {}^r \phi_B)]$$

$$\left[ 1 + \sum_\kappa {}^\kappa \Lambda_{r\max} \sin(\kappa(\alpha_{si} - \Omega t) + {}^\kappa \phi_{\Lambda r}) \right]$$

The filtered signals $u_{f1}$, $u_{f2}$ and $u_{f3}$ are sent to envelope extraction means 31 which are shown in FIG. 8.

The signals $e_i$ at the output of the envelope extraction means 31 appear in the form:

$$e_i = 2 \cdot V \cdot L \cdot {}^p B_{\max} \cdot \left[ 1 + \sum_\eta {}^\eta \Lambda_{a\max} \sin(\eta \alpha_{si} + {}^\eta \phi_{\Lambda a}) \right] \quad [12]$$

$$\left[ 1 + \sum_\kappa {}^\kappa \Lambda_{r\max} \sin(\kappa(\alpha_{si} - \Omega t) + {}^\kappa \phi_{\Lambda r}) \right]$$

Figure 10:
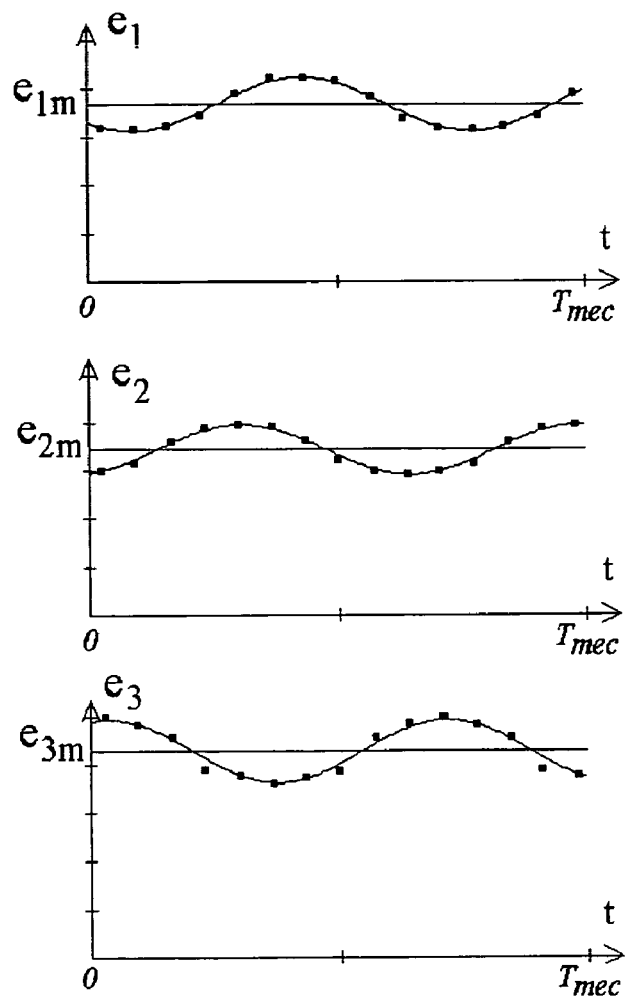
FIG. 10 shows the output signals after envelope extraction.

FIG. 10 shows the signals $e_i$ representing the envelopes of the signals $u_{f1}$ at the output of the envelope extraction means 31.

From equation [12], it can be seen that, for a given value $\alpha_{si}$, $e_i$ depends only on time.

The temporal mean value $e_{im}$ of these signals, calculated over a period of rotation of the machine, is equal to:

$$e_{im} = \frac{1}{T_{mec}} \int_0^{T_{mec}} e_i dt \quad [13]$$

$$= 2 \cdot V \cdot L \cdot {}^p B_{\max} \left[ 1 + \sum_\eta {}^\eta \Lambda_{a\max} \sin(\eta \alpha_s + {}^\eta \phi_{\Lambda a}) \right]$$

with $T_{mec}$ = period of rotation of the machine

Let $e_{ms}$ be the spatial mean value of the temporal mean values $e_{im}$ of all the turns installed on the periphery of the machine $$e_{ms} = \frac{1}{N_{spires}} \sum_{i=1}^{N_{spires}} e_{im}(\alpha_{si}) = {}^p B_{\max} \quad [14]$$

$N_{spires}$ = total number of measurement turns

The errors related to the stator magnetic circuit are consequently determined by $$\Lambda_a(\alpha_s) = 1 + \sum_\eta {}^\eta \Lambda_{a\max} \sin(\eta \alpha_s + {}^\eta \phi_{\Lambda a}) \quad [15]$$

$$= e_{im} / e_{ms}$$

Likewise, the errors related to the rotor can be deduced from [12] and [13]:

$$\Lambda_r(\alpha_s) = 1 + \sum_\kappa {}^\kappa\Lambda_{r\max}\sin(\kappa(\alpha_s - \Omega t) + {}^\kappa\phi_{\Lambda r}) \quad [16]$$

$$= e_i / e_{im}$$

It will be noted that the function $\Lambda_r(\alpha_s)$ is the same for any of the measurement turns. Consequently, a simplified measurement device, which is able to measure only this function, respectively only an error concerning the rotor, could comprise just a single measurement turn or loop arranged at a single location on the periphery of the stator.

Figure 11:
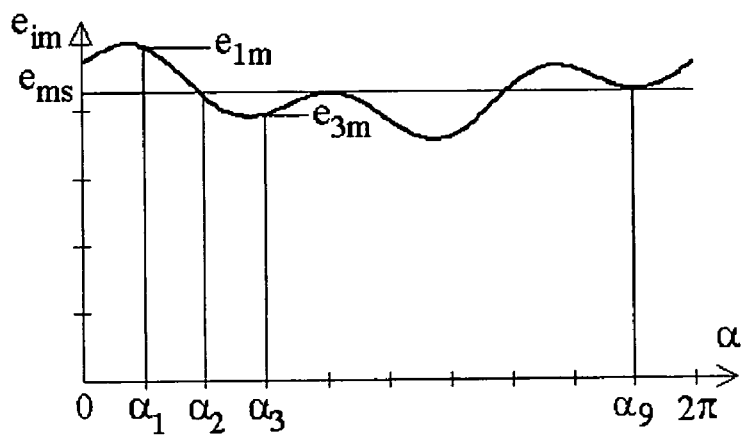
FIG. 11 shows the mean values $e_{i_m}$ of the envelopes as a function of the angular position $\alpha_{si}$ of the turns.

FIG. 11 shows the mean values $e_{im}$ of the envelopes as a function of the angular position of the measurement turns. In the example considered here, the machine has ten measurement turns distributed regularly along the periphery of the stator.

Knowing the distribution of the induction in the air gap and also the design values such as the axial length La and the bore radius R, it is easy to then determine the magnetic force F between the stator and the rotor of the machine over a portion of or over the entire bore from the magnetic pressure per unit surface σ:

$$\sigma = B^2/2\mu_0 \text{ and} \quad [17]$$

$$F = La \cdot R \cdot \int_{\alpha_1}^{\alpha_2} \sigma \cdot d\alpha \quad [18]$$

Referring to FIG. 8, there can be seen all the steps of the signal processing method according to the invention. The induced voltage signals $u_i$, as shown by way of example in FIG. 7, coming from the various measurement turns or loops 2 are individually sent to the filtering means 30 which suppress the harmonics having frequencies greater than the electrical frequency of the machine, so as to deliver at the output the filtered signals $u_{fi}$, as shown by way of example in FIG. 9. These filtered signals are then sent to envelope extraction means 31 which supply at their output signals $e_i$ corresponding to the envelopes of the filtered signals, as shown by way of example in FIG. 10. These signals are then sent to harmonic analysis means 32 which are able to determine the mean values of the envelopes and also the temporal and spatial harmonics according to expressions [15] and [16].

Figure 12:
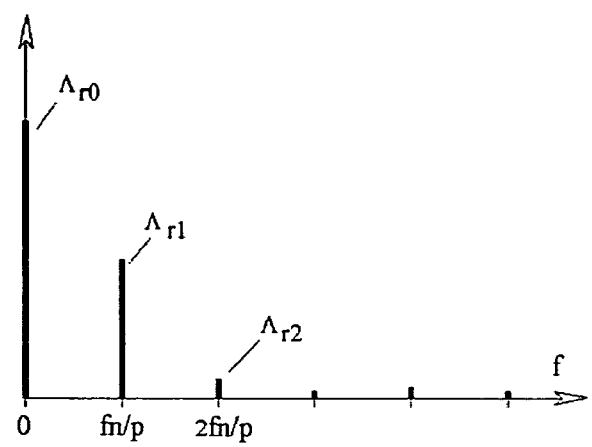
FIG. 12 shows the temporal spectrum at the output of the harmonic analysis means.

FIG. 12 shows an example of the temporal spectrum at the output of the harmonic analysis means 32.

Figure 13:
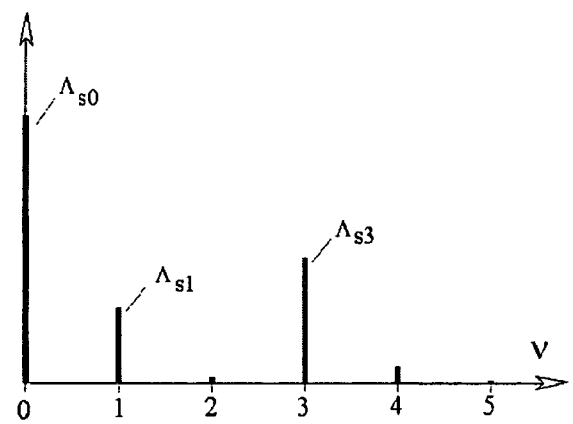
FIG. 13 shows the spatial spectrum at the output of the harmonic analysis means.

FIG. 13 shows an example of the spatial spectrum at the output of the harmonic analysis means 32.

These results make it possible for a computer 33 to calculate the types and values of the errors of the synchronous machine and also the non-compensated radial magnetic force which results therefrom according to relations [1] to [18] given above.

Thus, harmonic analysis of the function $e_{im}/e_{ms}$ from [15] makes it possible to determine the errors coming from the stator, whereas that of the function $e_i/e_{im}$ from [16] makes it possible to determine the errors coming from the rotor. In general, the order of the harmonic determines the type of error whereas the amplitude of the harmonic determines the amplitude of the error.

In the case of analyzing stator-related errors, the presence of a $1^{st}$-order harmonic indicates a static eccentricity between the rotor and the stator, as shown in FIG. 3. The amplitude of this harmonic makes it possible to calculate a value $\epsilon_s$ corresponding to the relative value of this static eccentricity with respect to the mean air gap of the machine. The presence of a higher-order harmonic indicates a deformation of the stator, as shown by way of example in FIG. 5, with a $2^{nd}$-order harmonic indicating a generally elliptical shape whereas a higher-order harmonic indicates a generally polygonal shape with rounded sides and corners, the order of the harmonic indicating the number of sides of the polygon; the amplitude of this harmonic indicates the relative value of this deformation with respect to the mean air gap of the machine.

In the case of analyzing rotor-related errors, the presence of a $1^{st}$-order harmonic indicates a dynamic eccentricity between the rotor and the stator, as shown in FIG. 2. The amplitude of this harmonic makes it possible to calculate a value $\epsilon_d$ corresponding to the relative value of this dynamic eccentricity with respect to the mean air gap of the machine.

The presence of a higher-order harmonic indicates an error related to the excitation circuit, the amplitude of this harmonic indicating the relative value of this error with respect to the mean induction in the air gap.

An eccentricity of the rotor relative to the stator gives rise to the appearance of a considerable non-compensated magnetic force. Therefore, the presence of a $1^{st}$-order harmonic, when analyzing both stator-related errors and rotor-related errors, indicates that the rotor is subject to a non-compensated magnetic force. From relations [17] and [18], it is possible to determine the value of this force, knowing the dimensions of the rotor and also the induced voltages $u_i$ which are the images of the induction at the measurement location.

Usually, analysis of the stator-related errors and rotor-related errors reveals the presence of a number of harmonics, thereby indicating the simultaneous presence of several types of error on the machine.

As mentioned above, the presence of an error of one or the other of these types gives rise to a non-uniform distribution of the induction below each pole, thus creating considerable magnetic forces which may be up to several hundred tons and can cause in some cases sticking of the rotor in the stator, leading to considerable damage to the machine. Consequently, the detection of one or the other of these errors may give rise to an alarm which stops the machine automatically or upon intervention by the operator.

Figure 14:
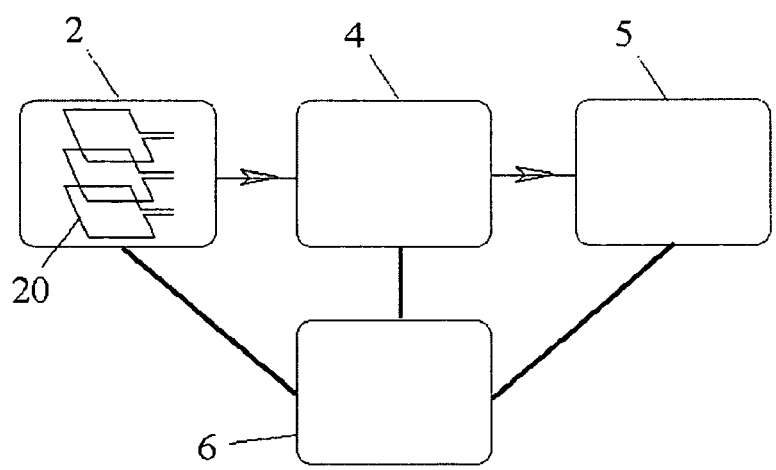
FIG. 14 shows the block diagram of a device for continuously measuring a synchronous machine according to the invention.

FIG. 14 schematically shows a device for continuously monitoring and measuring stator and rotor errors in the magnetic circuits of a synchronous machine using the method for processing induced voltage signals according to the invention as described above.

This device comprises measurement means 2 comprising a number of measurement turns or loops 20 distributed around the periphery of the stator, signal processing means 4 according to the invention and also communication means 5 which can transmit the measurement results to outside the machine. The three aforementioned means 2, 4 and 5 are supplied with power by power supply means 6 which are able to supply the necessary power to the device, this power possibly coming from outside the machine via power supply cables or being taken directly on the machine by capturing the magnetic flux that is produced.

The signal processing means 4 of the device mounted on the machine and shown in FIG. 14 may comprise one or more of the modules 30, 31, 32 and 33 shown in FIG. 8, the module or modules which are not included in the device mounted on the machine then being arranged outside the machine, after the transmission means 5.

This device may be supplemented by means (mentioned above and not shown in the figure) which can generate and transmit an alarm, this alarm possibly serving to stop the machine.

The installation of two identical monitoring devices as described above at each axial end of a synchronous machine furthermore makes it possible to monitor the parallelism between the axes of the stator and rotor.

The invention claimed is:

1. A method of processing induced voltages coming from at least one measurement turn arranged on a synchronous machine, so as to capture an image of the induction in the air gap of the machine at the location of the turn, in order to determine the types and values of the stator and rotor errors in the magnetic circuits of the machine, characterized in that it comprises the following steps:
individually taking said induced voltages ($u_i$) at the terminals of each turn and transmitting said induced voltages to filtering means which are able to eliminate the components having frequencies greater than the fundamental frequency of the machine ($f_n$),
individually transmitting the output signals ($u_{fi}$) of the filtering means to envelope extraction means which are able to supply output signals ($e_i$) which are images of the envelopes of the output signals of the filtering means,
transmitting the output signals ($e_i$) of the envelope extraction means to harmonic analysis means which are able to determine the temporal and spatial harmonic spectra and also the temporal mean values ($e_{im}$) of said output signals ($e_i$) along with the spatial mean value ($e_{ms}$) of said temporal mean values ($e_{im}$),
transmitting said temporal and spatial harmonic spectra and also said output signals ($e_i$) and said temporal and spatial mean values to calculation means which are able to determine independently the type of stator or rotor error and to calculate its relative value.

2. The method as claimed in claim 1, characterized in that said calculation means furthermore calculate the value of the magnetic force (F) due to this or these error(s).

3. The method as claimed in claim 1, characterized in that said calculation means determine the ratio of the temporal mean values and of the spatial mean value ($e_{im}/e_{ms}$) so as to determine one or more stator errors in the magnetic circuit.

4. The method as claimed in claim 3, characterized in that the presence of a fundamental harmonic in the signal resulting from said ratio indicates the existence of a static eccentricity between the axes of the rotor and stator, the amplitude of said harmonic making it possible to determine the value of this eccentricity with respect to the mean air gap of the machine.

5. The method as claimed in claim 3, characterized in that the presence of a $2^{nd}$-order harmonic in the signal resulting from said ratio indicates an elliptical deformation of the stator, the amplitude of said harmonic making it possible to determine the value of this deformation with respect to the mean air gap of the machine.

6. The method as claimed in claim 3, characterized in that the presence of a harmonic above $2^{nd}$-order in the signal resulting from said ratio indicates a polygonal deformation of the stator, the amplitude of said harmonic making it possible to determine the value of this deformation with respect to the mean air gap of the machine.

7. The method as claimed in claim 1, characterized in that said calculation means determine the ratio of the values of the output signals of the envelope extraction means and of the temporal mean values ($e_i/e_{im}$) so as to determine one or more rotor errors in the magnetic circuit.

8. The method as claimed in claim 7, characterized in that the presence of a fundamental harmonic in the signal resulting from said ratio indicates the existence of a dynamic eccentricity between the axes of the rotor and stator, the amplitude of said harmonic making it possible to determine the value of this eccentricity with respect to the mean air gap of the machine.

9. The method as claimed in claim 7, characterized in that the presence of a harmonic above $1^{st}$-order in the signal resulting from said ratio indicates an error associated with the excitation circuit of the machine, the amplitude of said harmonic making it possible to determine the relative value of this error with respect to the mean induction in the air gap.

10. The method as claimed in claim 1, characterized in that the detection of an error generates an alarm.

11. The monitoring device as claimed in claim 10, characterized in that the calculation means are able to calculate the value of the magnetic force (F) due to this or these error(s).

12. A device for continuously monitoring a synchronous machine for implementing the method as claimed in claim 1, characterized in that it comprises:
means for measuring induced voltages ($u_i$), comprising at least one measurement loop comprising at least one measurement turn which is able to capture an image of the induction in the air gap of the machine at the location of the measurement loop,
filtering means which are able to eliminate the components having frequencies greater than the fundamental frequency of the machine ($f_n$),
envelope extraction means which are able to supply output signals ($e_i$) which are images of the envelopes of the output signals of the filtering means,
harmonic analysis means which are able to determine the temporal mean values ($e_{im}$) of said output signals ($e_i$) along with the spatial mean value ($e_{ms}$) of said temporal mean values ($e_{im}$),
calculation means which are able to determine independently the type of stator or rotor error and to calculate its relative value.

13. The monitoring device as claimed in claim 12, characterized in that, with the means for measuring induced voltages ($u_i$) being arranged on the machine, at least one of said filtering means, said envelope extraction means, said harmonic analysis means and said calculation means is also mounted on the machine, said device furthermore comprising power supply means for said means mounted on the machine.

14. The monitoring device as claimed in claim 13, characterized in that the power supply means are able to capture the induction flux produced by the machine in order to supply power to said means mounted on the machine.

15. The monitoring device as claimed in claim 12, characterized in that the filtering means, envelope extraction means, harmonic analysis means or calculation means which are not mounted on the machine are connected to the means mounted on the machine by the transmission means.

16. The monitoring device as claimed in claim 12, characterized in that the means for measuring induced voltages comprise a number of measurement loops which are regularly distributed over the periphery of the stator.

17. The monitoring device as claimed in claim 16, characterized in that each measurement loop surrounds a portion of the yoke of the stator and passes via a recess, a ventilation slot and the outside of the stator.

18. The monitoring device as claimed in claim 17, characterized in that each measurement loop comprises a single turn.

19. The monitoring device as claimed in claim 12, characterized in that it furthermore comprises a means of generating and transmitting an alarm.

20. The monitoring device as claimed in claim 12, characterized in that, arranged at one longitudinal end of the machine and associated with a similar device arranged at the other end of the machine, the signals supplied by the two devices are able to make it possible to determine a non-parallelism between the axes of the rotor and stator of the machine.

* * * * *

UNITED STATES PATENT AND TRADEMARK OFFICE
CERTIFICATE OF CORRECTION

| | |
|---|---|
| PATENT NO. | : 7,323,843 B2 |
| APPLICATION NO. | : 10/545769 |
| DATED | : January 29, 2008 |
| INVENTOR(S) | : Xuan Mai Tu et al. |

It is certified that error appears in the above-identified patent and that said Letters Patent is hereby corrected as shown below:

On the Title Page, Item (75) Inventors, please correct inventor Tu's name to read as follows: -- Xuan Mai Tu --.

On the Title Page, Item (73), Assignee: Please correct the city to -- Lausanne (CH --.

UNITED STATES PATENT AND TRADEMARK OFFICE
CERTIFICATE OF CORRECTION

PATENT NO.      : 7,323,843 B2                                       Page 2 of 2
APPLICATION NO. : 10/545769
DATED           : January 29, 2008
INVENTOR(S)     : Xuan Mai Tu et al.

It is certified that error appears in the above-identified patent and that said Letters Patent is hereby corrected as shown below:

At column 5, please correct equations [8] and [9] to be shown as follows:

$$u(\alpha_s) = V.L \left[ \sum_{\upsilon} {}^{\upsilon}B_{max} \sin(\upsilon(\alpha_s - \Omega t) + {}^{\upsilon}\phi_B) \right] \quad [8]$$

$$\left[ 1 + \sum_{\eta} {}^{\eta}\Lambda_{a\,max} \sin(\eta\alpha_s + {}^{\eta}\phi_{\Lambda a}) \right]$$

$$\left[ 1 + \sum_{\kappa} {}^{\kappa}\Lambda_{r\,max} \sin(\kappa(\alpha_s - \Omega t) + {}^{\kappa}\phi_{\Lambda r}) \right]$$

$$u(\alpha_{si}) = V.L \left[ \sum_{\upsilon} {}^{\upsilon}B_{max} \sin(\upsilon(\alpha_{si} - \Omega t) + {}^{\upsilon}\phi_B) \right] \quad [9]$$

$$\left[ 1 + \sum_{\eta} {}^{\eta}\Lambda_{a\,max} \sin(\eta\alpha_{si} + {}^{\eta}\phi_{\Lambda a}) \right]$$

$$\left[ 1 + \sum_{\kappa} {}^{\kappa}\Lambda_{r\,max} \sin(\kappa(\alpha_{si} - \Omega t) + {}^{\kappa}\phi_{\Lambda r}) \right]$$

Signed and Sealed this

Twenty-ninth Day of July, 2008

JON W. DUDAS
*Director of the United States Patent and Trademark Office*